United States Patent [19]
Hayashi

[11] Patent Number: 5,412,711
[45] Date of Patent: May 2, 1995

[54] ELECTRONIC EXCHANGE HAVING FUNCTION OF CALLING NUMBER DELIVERY SERVICE AND BLOCKING

[75] Inventor: Masami Hayashi, Yokohama, Japan

[73] Assignee: Fujitsu Limited, Kanagawa, Japan

[21] Appl. No.: 189,420

[22] Filed: Jan. 31, 1994

[30] Foreign Application Priority Data

Sep. 14, 1993 [JP] Japan .................................. 5-228988

[51] Int. Cl.⁶ .......................... H04M 1/64; H04M 1/57
[52] U.S. Cl. ...................................... 379/67; 379/142; 379/196; 379/246
[58] Field of Search .................... 379/127, 142, 67, 88, 379/188, 196, 197, 199, 242, 243, 244, 245, 246, 249

[56] References Cited

U.S. PATENT DOCUMENTS

| | | | |
|---|---|---|---|
| 4,926,471 | 5/1990 | Ikeda | 379/142 |
| 5,033,076 | 7/1991 | Jones et al. | 379/199 |
| 5,228,080 | 7/1993 | Nutter et al. | 379/199 |
| 5,283,824 | 2/1994 | Shaw | 379/142 |

Primary Examiner—James L. Dwyer
Assistant Examiner—Daniel S. Hunter

[57] ABSTRACT

An electronic exchange capable of providing at least a calling number delivery (CND) service, including a registration search unit for investigating whether or not a call terminating subscriber is registered to use the CND service every time a call is initiated from a call originating subscriber, a confirmation unit for inquiring to the call originating subscriber, if the call terminating subscriber is registered to use the CND service, whether or not the call originating subscriber intends to achieve a calling number delivery blocking (CNDB) service, and a selective transmission unit for transmitting or not transmitting data indicative of the telephone number of the call originating subscriber in accordance with an answer responding to the inquiry by the confirmation unit.

8 Claims, 9 Drawing Sheets

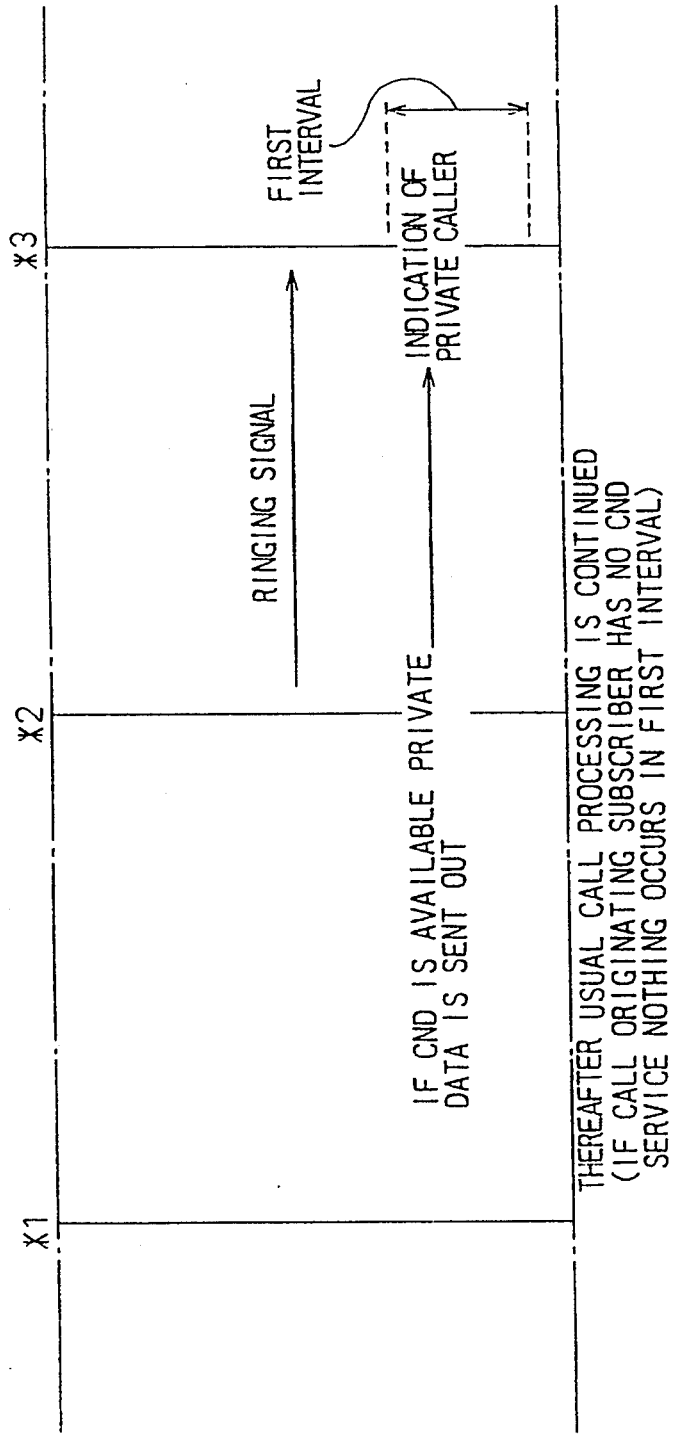

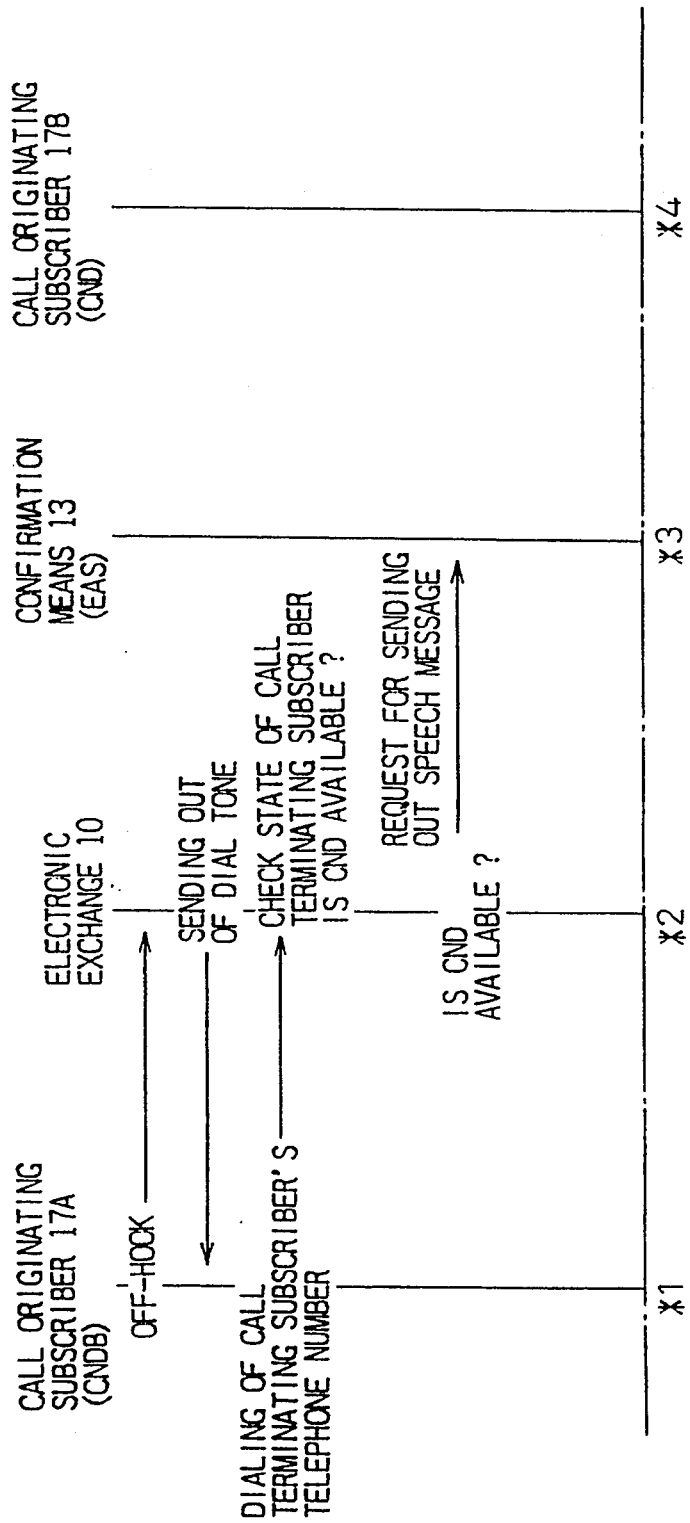

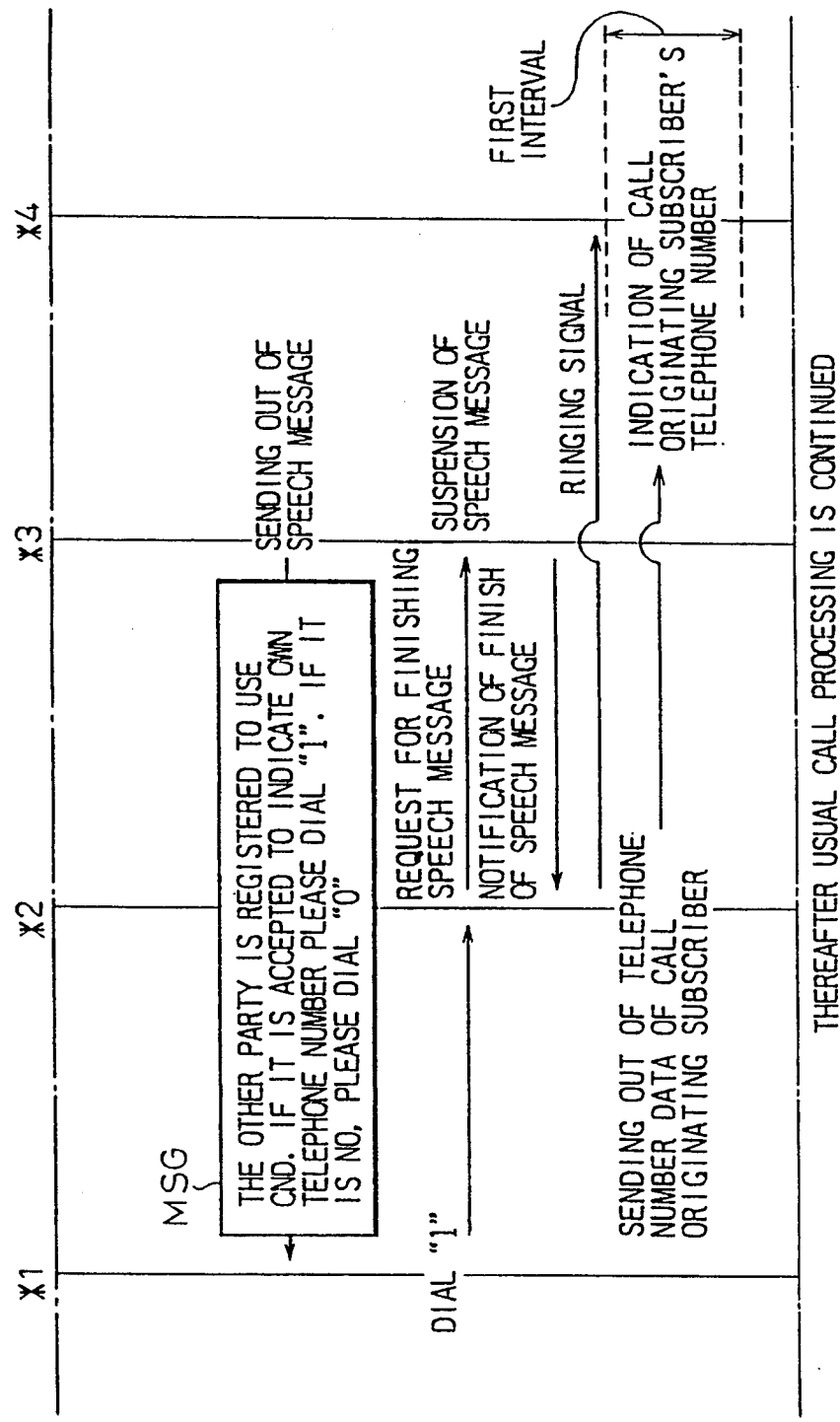

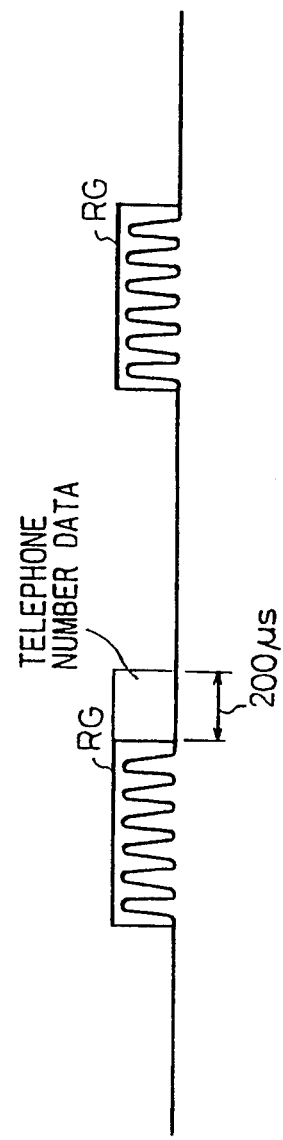

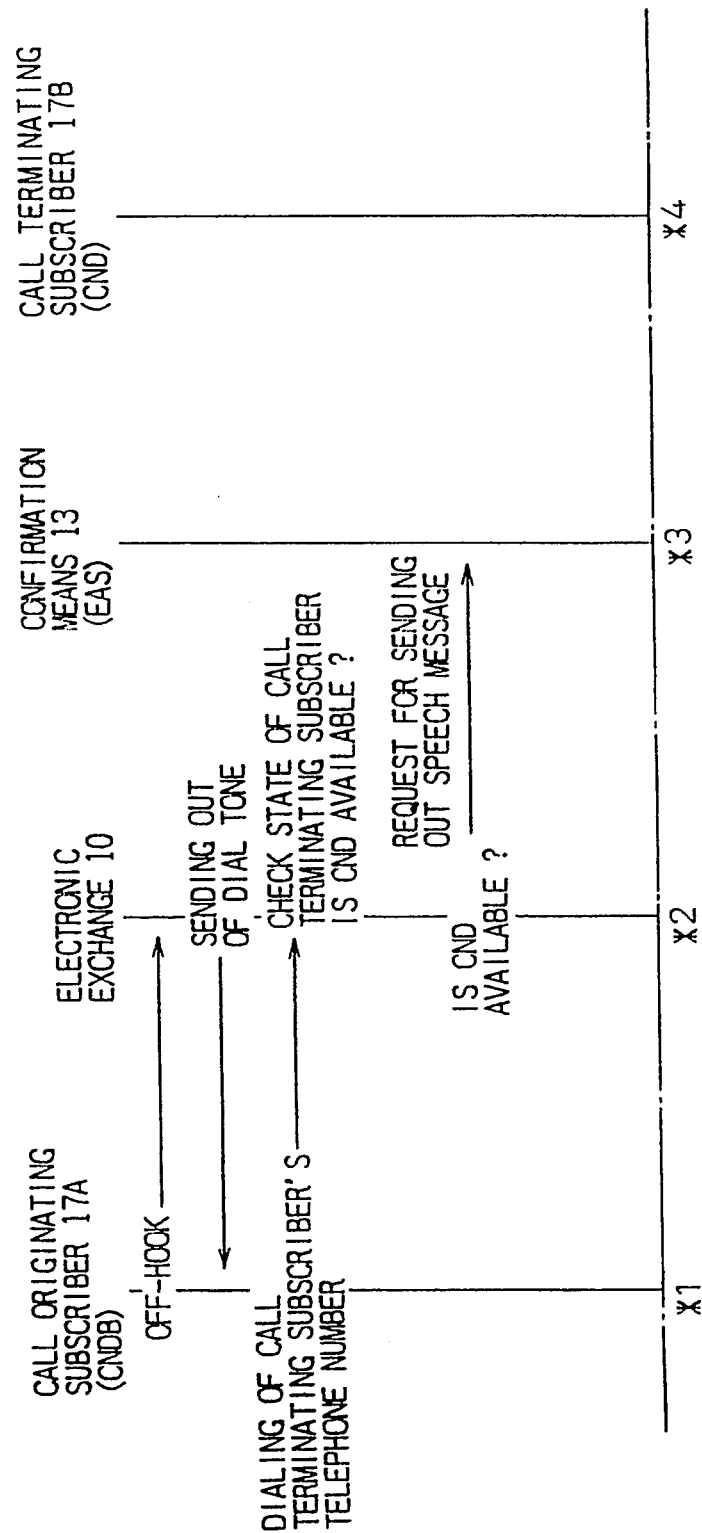

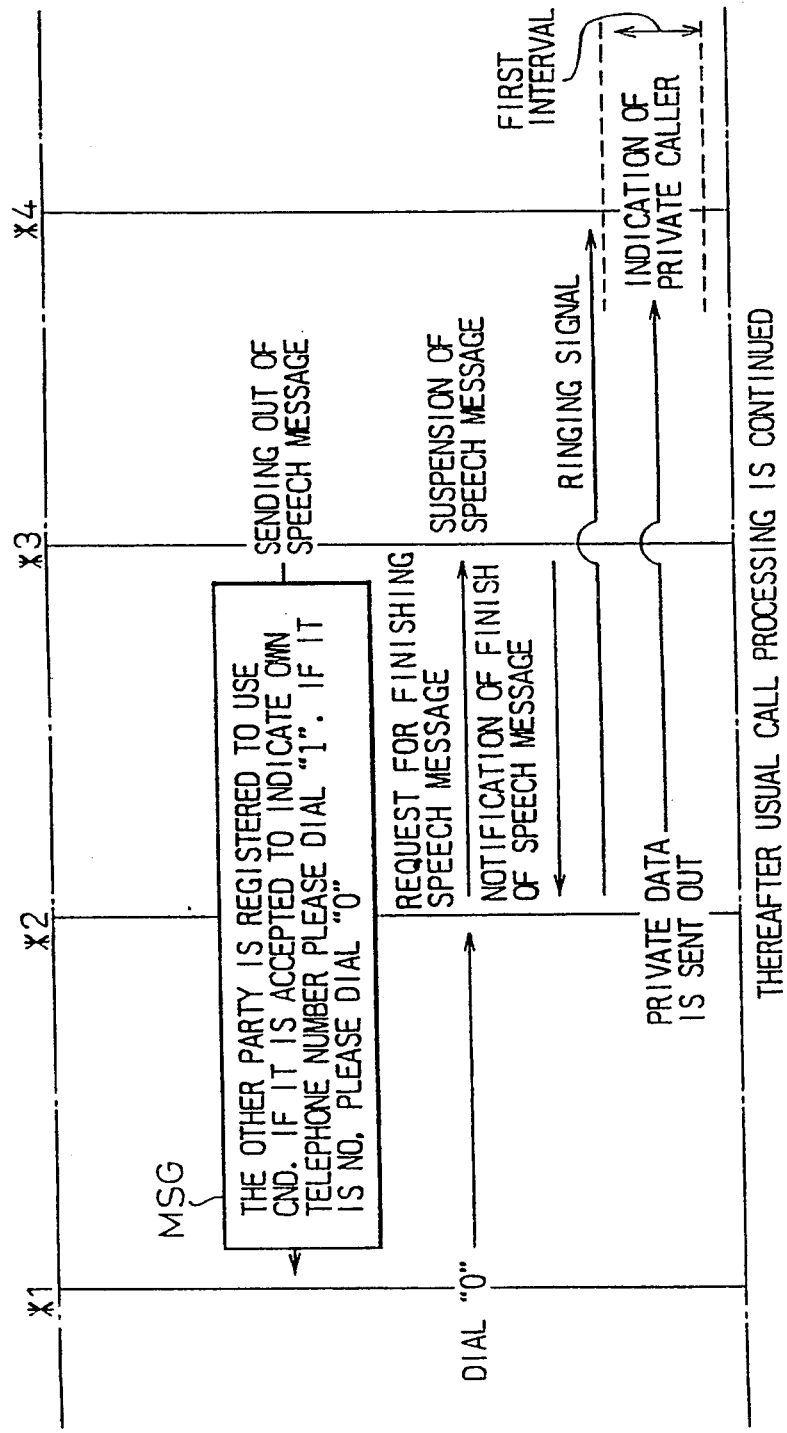

ELECTRONIC EXCHANGE HAVING FUNCTION OF CALLING NUMBER DELIVERY SERVICE AND BLOCKING

BACKGROUND OF THE INVENTION

1. Field of the Invention

The present invention relates to an electronic exchange having a function of a Calling Number Delivery (hereinafter, abbreviated to CND) service and a function of a Calling Number Delivery Blocking (hereinafter, abbreviated to CNDB) service and performing a switching between a call originating subscriber and a call terminating subscriber.

According to a specification by, for example, Bellcore for the North American market, varieties of class services are defined. For example, SCF = Selective Call Forwarding
SCR = Selective Call Rejection
COT = Customer Originated Trace
AC = Automatic Call Back
AR = Automatic Recall
DRCW = Distinctive Ringing Call Waiting and the aforementioned CND, CNDB and so on. The present invention intends to present a proposal for an improvement of, among the above recited services, the CND service and the CNDB service. Here, the CNDB service is a service for indicating a telephone number of a call originating subscriber to a call terminating subscriber. Namely, a call terminating subscriber can see, before taking his telephone off-hook, the telephone number of a call originating subscriber on a display mounted on a part of the telephone. Therefore, a service is given by which a terminating subscriber can reject beforehand, during ringing, a call originated from a subscriber which is not wanted by the call terminating subscriber.

On the other hand, the aforesaid CNDB service exists, which service makes a pair with the aforesaid CND service. The CNDB service is a service, when the call terminating subscriber is registered in advance as a person who is allowed to use the CND service, which can block indication of the own (call originating subscriber) telephone number on a display at the call terminating subscriber side. Namely, even if the call terminating subscriber is allowed to use the CND service, this call terminating subscriber cannot see a telephone number of the other party (call originating subscriber). Therefore, a service is given which can minimize the possibility of a rejection by the other party (call terminating subscriber) if the call is not wanted by the terminating party.

2. Description of the Related Art

As will be explained later with reference to the attached drawing, there were at least the following two problems:

(1) It is troublesome, for the call originating subscribers registered to use the CNDB service, to do an operation, i.e., a dialing of an access code, at all time for blocking an indication of a telephone number so long as it is not evident, in advance, that the other party is not registered to use the CND service.

(2) If a call originating party forgets to do the operation for blocking an indication of a telephone number, the own telephone number is inevitably indicated at the telephone terminal of the other party.

SUMMARY OF THE INVENTION

Therefore, in view of the above-mentioned two problems, the present invention has as its object the provision of an electronic exchange by which the blocking of an indication of a telephone number is performed only when the blocking of an indication of a telephone number is actually needed.

To attain the above object, the present invention provides an electronic exchange having: a registration search means for investigating whether or not the call terminating subscriber is registered to use the CND service every time a call is initiated from a call originating subscriber; a confirmation means for inquiring to the call originating subscriber, if the call terminating subscriber is registered to use the CND service, whether or not the call originating subscriber intends to use the CNDB service; and a selective transmission means for transmitting or not transmitting data indicative of the telephone number of the call originating subscriber in accordance with varieties of answers responding to said inquiry.

BRIEF DESCRIPTION OF THE DRAWINGS

The above object and features of the present invention will be more apparent from the following description of the preferred embodiments with reference to the accompanying drawings, wherein:

FIGS. 1, 1A and 1B are views showing a conventional operational sequence for achieving a CND service;

FIGS. 4, 4A and 4B are views showing an operational sequence (part 1) according to the present invention;

FIG. 5 depicts an example of a transmission mode of a data indicating a telephone number in the present invention; and FIGS. 6, 6A and 6B are views showing an operational sequence (part 2) according to the present invention.

DESCRIPTION OF THE PREFERRED EMBODIMENTS

Before describing the embodiments of the present invention, the prior art and the problems therein will be first described with reference to the related figures.

Figure 1A:
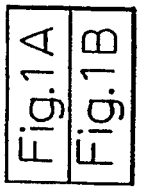
Figure 1A:
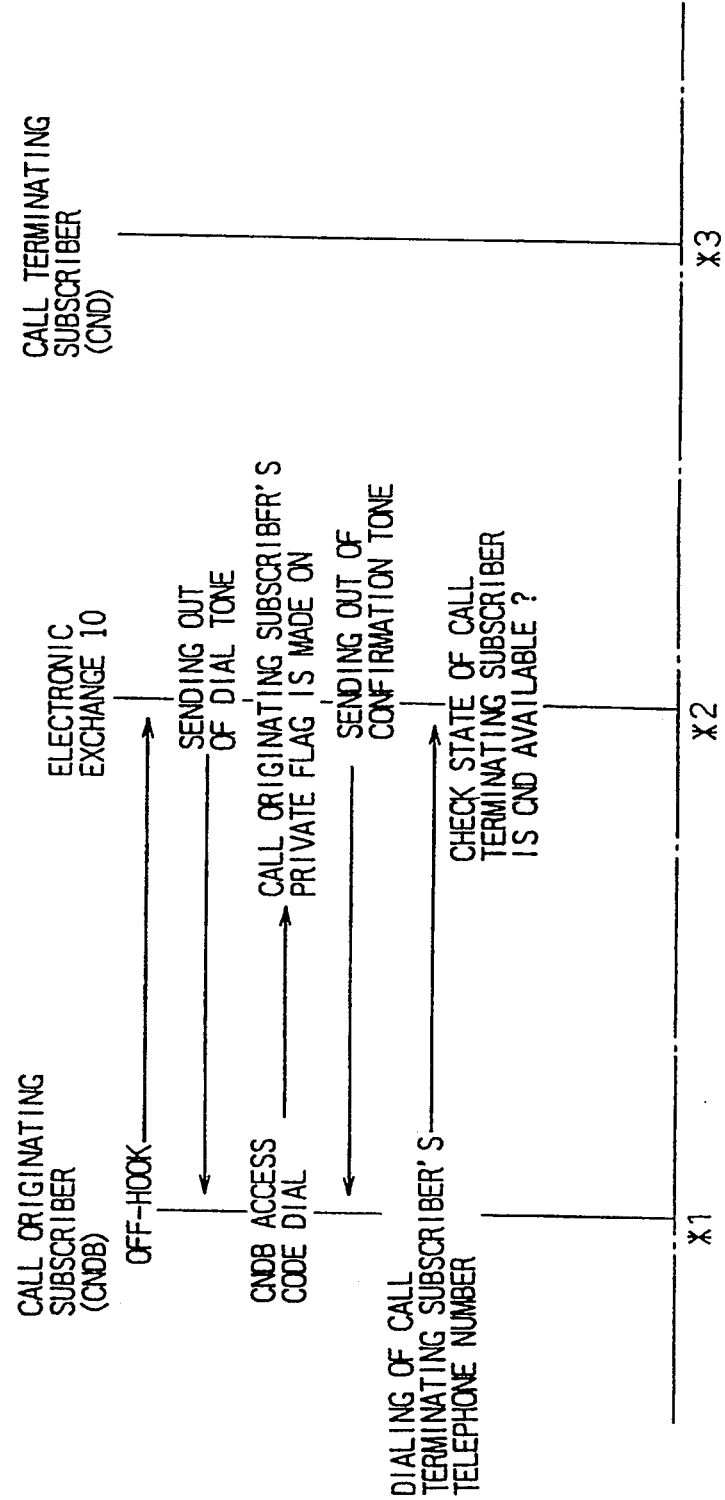

FIGS. 1A and 1B are views showing a conventional operational sequence for achieving a CND service. In these figures, the left side represents the call originating subscriber side which is registered to use the CNDB service, the right end represents the call terminating subscriber side which is registered to use the CND service, and the center represents the area of the electronic exchange 10 which achieves the switching operations between the subscribers and further presents varieties of services thereto.

First the call originating subscriber puts his own telephone terminal in off-hook state. Responding to this off-hook, the electronic exchange 10 returns a dial tone to this call originating subscriber. When the call originating subscriber acknowledges the returned dial tone, the subscriber dials a CNDB access code to use the CNDB service in a case where the call originating subscriber is not willing to indicate his own telephone number to the other subscriber. Conversely, if it is all right for the call originating subscriber to indicate his own telephone number, the CNDB access code is not input by the subscriber.

When the electronic exchange 10 receives the thus input CNDB access code, it is recorded that a call originating subscriber's private flag is made on in a part of a memory mounted in the exchange 10. Since the private flag is on, the electronic exchange 10 suspends the function for sending out the call originating subscriber's telephone number to the outside. At the same time, a confirmation tone is returned to the call originating subscriber, and thereafter, the subscriber starts dialing the telephone number for the call terminating subscriber.

Here, it is investigate whether or not the call terminating subscriber is registered as a person who is allowed to use the CND service and, at the same time, a ringing signal is sent out to this call terminating subscriber. If it is confirmed that the call terminating subscriber is allowed to use the CND service, the electronic exchange sends out private data to the call terminating subscriber. The private data is an information to indicate to the other party that the related call originating subscriber is not willing to indicate his own telephone number, due to the CNDB service, and therefore, it is indicated on the display of the call terminating subscriber that the received call is from a private caller. Thereafter, after an elapse of a predetermined time, a usual call processing is executed when the call terminating subscriber puts his telephone in an off-hook state.

The above-mentioned Calling Number Delivery Blocking (CNDB) service can minimize the possibility of rejection of a call by the other party, and further, the CNDB can produce a merit that an individuals privacy can be protected. On the other hand, however, the following problems are raised.

(1) If it is known beforehand for a call originating subscriber whether or not the call terminating subscriber is a person who is registered to use the CND service, it is enough for the call originating subscriber to determine that the access code for blocking the indication of the own telephone number is to be dialed or not merely depending on whether or not the call originating subscriber intends to indicate the own telephone number.

However, if it is not known beforehand for the call originating subscriber whether or not the call terminating subscriber is a person who is registered to use the CND service, the subscriber must first dial the access code for blocking the indication of the own telephone number regardless whether or not the call terminating subscriber is actually registered to use the CND service, since the privacy of the call originating subscriber should first be protected. In this case, the aforesaid dialing of the access code eventually would become a waste, if, in fact, the call terminating subscriber is not registered to use the CND service.

As a result, the aforementioned first problem is produced. That is, it is troublesome, for the call originating subscribers registered to use the CNDB service, to do an operation, i.e., a dialing of an access code, at all times for blocking an indication of a telephone number so long as it is not evident, in advance, that the other party is not registered to use the CND service.

(2) If the call originating subscriber is a person who is registered to use the CND service, the subscriber must achieve an operation for blocking the indication of his own (call originating subscriber) telephone number, when the subscriber call up the other party, in a case where the call originating party is not willing to indicate his own telephone number to the other party.

However, the aforementioned second problem is produced, although it is a matter of course, that if a call originating party forgets to do the operation for blocking an indication of a telephone number, his own telephone number is inevitably indicated at the telephone terminal of the other party.

Figure 2:
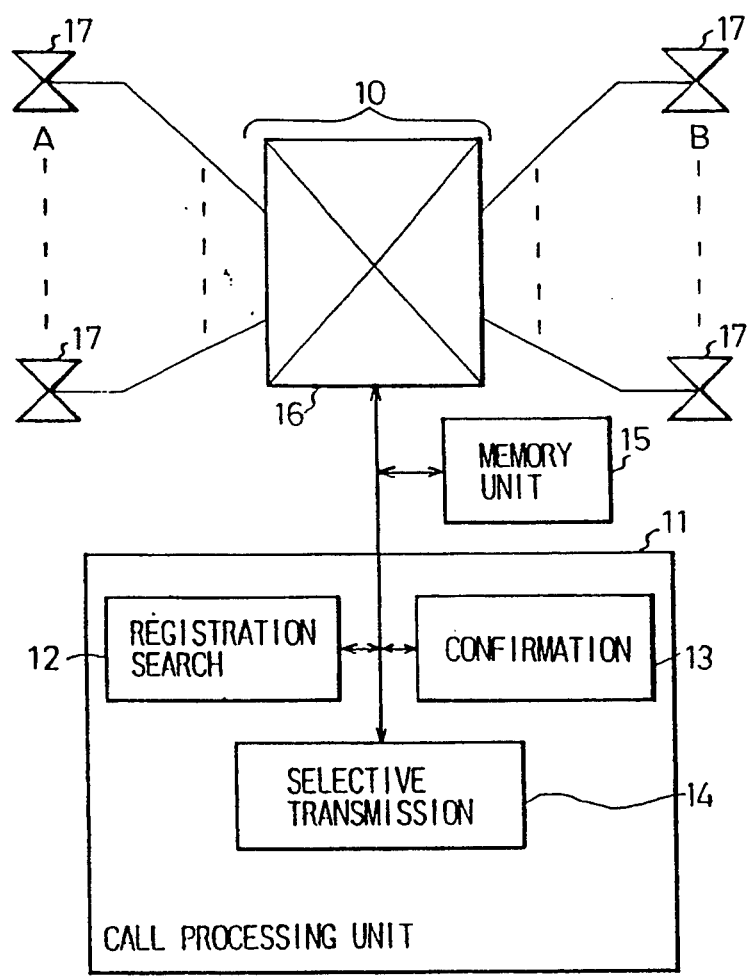
FIG. 2 is a view of the principle construction of the present invention.

FIG. 2 is a view of the principle construction of the present invention. In the figure, reference numeral 10 represents, as a whole, an electronic exchange portion, which is comprised of a call processing unit 11 for handling a switching of calls and an overall execution of a variety of services, a network 16 for actually performing the aforesaid call switching between the telephone terminals 17, and a memory unit 15 for storing a program needed for performing the switching operation and the services and also storing data momentarily and so on.

In the electronic exchange 10, the present invention particularly features the portions represented by a registration search means 12, a confirmation means 13 and a selective transmission means 14. These means can be constructed individually as respective hardware, however, it is preferable to construct same in association with software processing by a CPU. The registration search means 12 investigates, when the network 16 receives, from a call originating subscriber (17A) who is registered to use the CNDB service, a telephone number of a call terminating subscriber (17B), whether or not the call terminating subscriber (17B) is a person who is registered to use the CND service. The related registration can be effected in the memory unit 15.

The confirmation means 13 is activated, when the registration search means 12 finds that the restration in question exists, to return an electronic message to the call originating subscriber (17A), so as to confirm whether the subscriber (17A) allows or inhibits the execution of the CNDB service.

The selective transmission means 14 suspends the transmission of the telephone number of the call originating subscriber (17A) to the call terminating subscriber (17B), if an answer is returned, in response to the aforesaid electronic message, from the call originating subscriber (17A), which answer indicates that the CNDB service is to be executed. Contrary to the above, if the answer indicates that the CNDB service is not to be executed, the means 14 transmits the telephone number of the subscriber (17A) to the call terminating subscriber (17B).

The mode of operation of the present invention is as follows. When a call originating subscriber registered to use the CNDB service calls up a call terminating subscriber, first the registration search means 12 investigates whether or not the related call terminating subscriber is a person who is registered to use the CND service. According to the result of the above investigation, if it is found that the call terminating subscriber is a person who is registered to use the CND service, then the confirmation means 13 inquires, through an electronic message, to the call originating subscriber whether or not the CNDB is to be executed. At this stage, the aforementioned two problems can be overcome. So, the telephone number of the call originating subscriber can be transmitted or not transmitted to the call terminating subscriber by the selective transmission means 14 surely according to the intention of the call originating subscriber.

Figure 3:
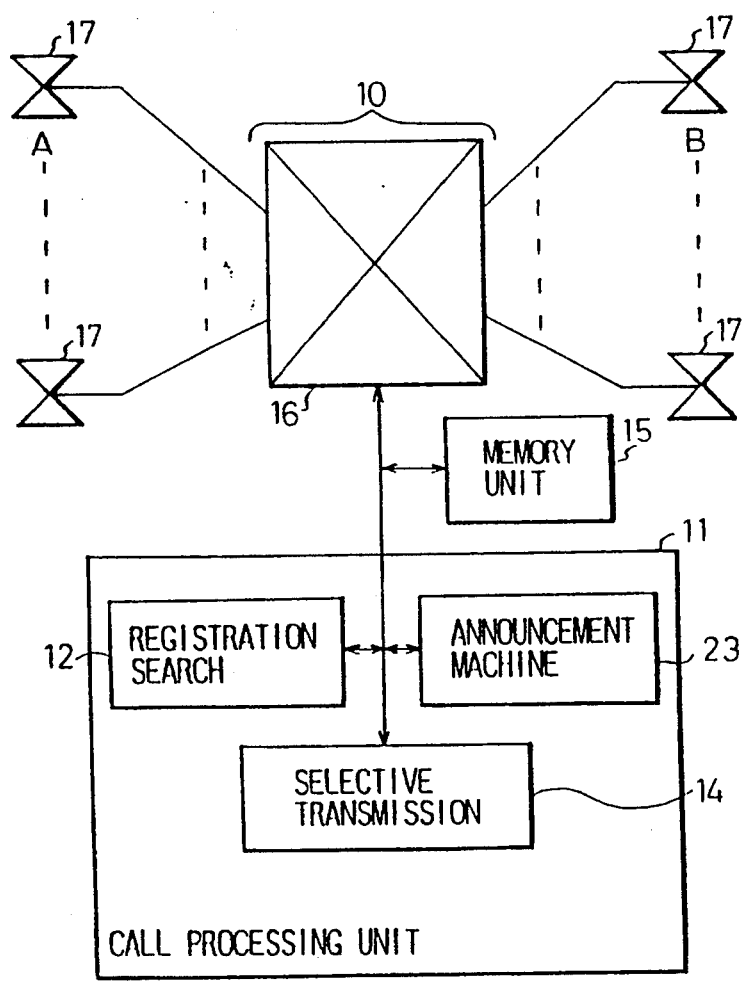
FIG. 3 is a view of an embodiment according to the present invention.

FIG. 3 is a view of an embodiment according to the present invention. The embodiment specifically illustrates the confirmation means 13 shown in FIG. 2, in which the means 13 is realized by an announcement machine 23. The announcement machine 23 generates the aforesaid electronic message in the form of a speech message.

It is also possible to employ an apparatus, as the announcement machine 23, which generates not the abovementioned speech message but generates a character message and output same. In this case, the character message is indicated on the display of the telephone terminal 17 on the call originating subscriber side. It is, however, preferable in view of practical use to employ, as the announcement machine 23, an apparatus which generates and outputs the speech message. This is because, such apparatus is commercially available and easily obtainable, which apparatus is known usually as an Expanded Announcement Machine (EAS). The EAS is formally entitled as "Audichron IIS System 3" made by Electronic Telecommunication Inc. The EAS has a function to select and output one of speech messages, corresponding to the electronic message, wherein the EAS beforehand stores therein a plurality kinds of speech messages and, when the network 16 receives, from the call originating subscriber (17A) registered to use the CNDB service, the telephone number of the call terminating subscriber (17B), the EAS selects corresponding one of the stored speech messages and then outputs same.

The aforementioned answer, returned from the call originating subscriber (17A), is applied to the selective transmission means 14 in the form of the access code, wherein there are two kinds of access codes which correspond, on one hand, to a case where the CNDB service is to be executed, and on the other hand, to a case where the CNDB service is not to be executed. For example, if the CNDB service is not to be executed, the call originating subscriber dials "1" from the telephone terminal 17A. If the CNDB service is to be executed, the subscriber dials "0" from the telephone terminal 17A.

Note that the aforementioned answer is returned from the call originating subscriber (17A) by the dialing operation of the access code, however, the answering operation is not limited to such a dialing operation, but may be realized by, for example, applying the answer to the selective transmission means 14 in the form of an absence or a presence of a hooking operation at the telephone terminal 17A of the call originating subscriber.

Further, it is desirable for the confirmation means (EAS 23) to suspend the aforesaid activation, i.e., the generation of aforesaid speech message and the output of same, at the time when the aforesaid answer from the call originating subscriber (17A) is received at the network 16. This is because, even though the speech message is sent out repeatedly to the call originating subscriber (17A), once the call originating subscriber (17A) has returned the answer in responding to the speech message, the processing should promptly move to the next stage, i.e., the sending out of a ringing signal, so as to achieve a high speed call processing.

That is, after when the confirmation means (EAS 23) has received the aforesaid answer from the call originating subscriber 17A and therefore suspended the aforesaid activation, the electronic exchange 10 sends out the ringing signal to the call terminating subscriber (17B).

Note here that, as will be explained hereinafter, it is preferable to send out the telephone number of the subscriber (17A) to the subscriber (17B) in an idle term during the sending out of the ringing signal. This enables further shortening of the time required for the call processing.

FIGS. 4A and 4B are views showing an operational sequence (part 1) according to the present invention, which corresponds to the conventional operational sequence shown in FIGS. 1A and 1B, however, the column for the confirmation means 13, e.g., the EAS 23, is further added in FIGS. 4A and FIG. 4B.

First, the telephone terminal 17A of the call originating subscriber is put in an off-hook state. Responding to the off-hook state, the electronic exchange 10 returns a dial tone to the subscriber (17A). As soon as the dial tone is acknowledged by the call originating subscriber (17A), the subscriber (17A) starts dialing the telephone number of the call terminating subscriber (17B) while disregarding the access code, which is different from the aforementioned conventional operational sequence, so as to send the information of the other party to the electronic exchange 10 without delay.

When the telephone number of the call terminating subscriber is received by the electronic exchange 10, it is checked by the registration search means (see 12 of FIG. 3) whether or not the call terminating subscriber (17B) is a person who is registered to use the CND service. Here, we assume that the subscriber (17B) is registered to use the CND service.

When it is found that the call terminating subscriber (17B) is a person who is registered to use the CND service, the means 12 requests the confirmation means 13 (EAS) to generate and output the speech message. Responding to the above request, the confirmation means 13 (EAS 23) generates the speech message which is described in FIG. 4A as "MSG", and the thus generated message is output, via the electronic exchange 10, to the call originating subscriber (17A).

The call originating subscriber (17A) hearing the speech message reconfirms that, first, I (subscriber (17A)) am a person who is registered to use the CNDB service, and second, I (subscriber (17A)) am calling up a call terminating subscriber (17B) who is registered to use the CND service. Under the above reconfirmation, the subscriber (17A) determines the operation desired, to allow the indication of his own telephone number to the other party or to inhibit the indication of the same. Here, the aforementioned two problems can be overcome at the same time.

Based on the example of FIGS. 4A and 4B, the call originating subscriber (17A) returns the answer indicating that the subscriber allows an indication of the own telephone number to the other party. Namely, the subscriber (17A) dials "1". The related answer is sent to the selective transmission means 14 in the electronic exchange 10 and the means 14 commences the processing which copes with the above answer. Note that the confirmation means 13 (EAS 23) suspends the output of the speech message immediately after the reception of the aforesaid dialing of "1".

After this, the selective transmission means 14 transmits, after starting a usual call-up operation, i.e., a sending out of the ringing signal, data indicative of the telephone number of the call originating subscriber (17A)

to the call terminating subscriber (17B). By this, the thus sent telephone number is indicated on the display of the corresponding telephone terminal 17B.

FIG. 5 depicts an example of a transmission mode of a data indicative of the telephone number. This represents the transmitting waveform of the ringing signal described in FIG. 4B, wherein the ringing signal appears with a constant period. The term between one ringing signal RG and the adjacent ringing signal RG is a non-signal term. This being so, the non-signal term is utilized to send the data indicative of the telephone number of the call originating subscriber (telephone number data) to the other party.

FIGS. 6A and 6B are views showing an operational sequence (part 2) according to the present invention. This corresponds to the aforementioned FIGS. 4A and 4B, however, FIGS. 6A and 6B represent the case where the call originating subscriber (17A) decides that the indication of the own telephone number to the other party (call terminating subscriber) is to be inhibited. Most parts of the operational sequence in FIGS. 6A and 6B are identical to that shown in FIGS. 4A and 4B, but the difference therebetween is that the call originating subscriber (17A) dials, responding to the aforementioned message "MSG", "0" which is the answer from the subscriber (17A) indicating that his own telephone number should not be indicated to the other party.

The above answer, i.e., "0", is sent to the selective transmission means 14 in the electronic exchange 10 and the means 14 commences the processing which copes with the above answer. Note that the confirmation means 13 (EAS 23) suspends the output of the speech message immediately after the reception of the aforesaid dialing of "0".

After this, the selective transmission means 14 transmits, after starting a usual call-up operation, i.e., a sending out of the ringing signal, and processing similar to that of FIG. 1A is achieved.

As explained above, the present invention can surely overcome the problems raised in the conventional system, that is, even though a call originating subscriber registered to use the CNDB service can get an inherent merit of the CNDB service, the call originating subscriber is forced however, to carry out a troublesome dialing operation, and further his privacy cannot be protected if the call originating subscriber forgets to use a predetermined dialing operation.

I claim:

1. An electronic exchange performing a switching between a call originating subscriber and a call terminating subscriber as well as providing a calling number delivery service and a calling number delivery blocking service to particular subscribers, the electronic exchange comprising:

a registration search means for investigating, when the telephone number of the call terminating subscriber is received from the call originating subscriber who is registered to use the calling number delivery blocking service, whether or not the call terminating subscriber is a person who is registered to use the calling number delivery service;

a confirmation means which is activated when the registration search means has found that the call terminating subscriber is registered and is operative to return an electronic message to the call originating subscriber so as to confirm whether the call originating subscriber allows or inhibits the execution of the calling number delivery blocking service; and a selective transmission means which is operative to suspend the transmission of the telephone number of the call originating subscriber to the call terminating subscriber, if an answer is returned, responding to the electronic message, from the call originating subscriber, indicating that the calling number delivery blocking service is to be executed, and conversely, which is operative to transmit the telephone number of the call originating subscriber to the call terminating subscriber, if the answer indicates that the calling number delivery blocking service is not to be executed.

2. An electronic exchange as set forth in claim 1, wherein said confirmation means is an announcement machine which is operative to generate, as said electronic message, a speech message.

3. An electronic exchange as set forth in claim 2, wherein said announcement machine is constructed by an Expanded Announcement Machine which is operative to store beforehand a plurality of speech messages and to select and output, when the telephone number of the call terminating subscriber is received from the call originating subscriber who is registered to use the calling number delivery blocking service, one of said speech messages corresponding to the electronic message.

4. An electronic exchange as set forth in claim 1, wherein said answer from the call originating subscriber is applied to said selective transmission means in the form of an access code, where there are two kinds of access codes corresponding, on one hand, to a case where the calling number delivery blocking service is to be executed, and on the other hand, to a case where the calling number delivery blocking service is not to be executed.

5. An electronic exchange as set forth in claim 1, wherein said answer from the call originating subscriber is applied to said selective transmission means in the form of an absence or a presence of a hooking operation at a telephone terminal of the call originating subscriber.

6. An electronic exchange as set forth in claim 1, wherein said confirmation means is operative to suspend activation at the time when said answer is received from the call originating subscriber.

7. An electronic exchange as set forth in claim 6, wherein said electronic exchange is operative to send out a ringing signal to the call terminating subscriber, after said confirmation means has received said answer from the call originating subscriber and therefore suspended activation.

8. An electronic exchange as set forth in claim 7, wherein the telephone number of the call originating subscriber is sent out to the call terminating subscriber in an idle term during the sending out of said ringing signal.

* * * * *